United States Patent [19]
Greiner et al.

[11] Patent Number: 6,016,668
[45] Date of Patent: Jan. 25, 2000

[54] METHOD FOR DISSOLVING A HARDENED GLASS SOLDER, METHOD FOR SEPARATING COMPONENTS JOINED BY A GLASS SOLDER, METHOD FOR DISASSEMBLING A FUEL CELL

[75] Inventors: Horst Greiner, Forchheim; Manfred Wohlfart, Wiesenthau; Manfred Schnöller, Haimhausen, all of Germany

[73] Assignee: Siemens Aktiengesellschaft, Munich, Germany

[21] Appl. No.: 09/073,548

[22] Filed: May 6, 1998

Related U.S. Application Data

[63] Continuation of application No. PCT/DE96/02028, Oct. 24, 1996.

[30] Foreign Application Priority Data

Nov. 6, 1995 [DE] Germany .......................... 195 41 299

[51] Int. Cl.$^7$ .......................... C03C 19/00; C03C 23/00; C03C 25/00; C03C 27/00
[52] U.S. Cl. ..................... 65/23; 65/31; 429/49; 156/155
[58] Field of Search ................. 65/23, 30.1, 31; 216/24, 26, 96, 97; 156/155; 427/309; 429/49

[56] References Cited

U.S. PATENT DOCUMENTS

| | | | |
|---|---|---|---|
| 3,690,921 | 9/1972 | Elmore | 117/54 |
| 4,038,462 | 7/1977 | Rohr | 429/30 |
| 4,428,986 | 1/1984 | Schachameyer | 427/309 |
| 4,721,549 | 1/1988 | Bogenschutz et al. | 156/663 |
| 4,769,083 | 9/1988 | Tiritilli . | |
| 4,913,784 | 4/1990 | Bogenschutz et al. | 204/29 |
| 5,411,919 | 5/1995 | Inada | 437/209 |
| 5,525,800 | 6/1996 | Sanghera et al. | 250/339.08 |
| 5,718,984 | 2/1998 | Iwase et al. | 429/49 |

OTHER PUBLICATIONS

"Fuel Cell Handbook", A.J. Appelby et al., Van Nostrand Reinhold, 1988, pp. 442 to 454.

*Primary Examiner*—Stanley S. Silverman
*Assistant Examiner*—Jacqueline A. Ruller
*Attorney, Agent, or Firm*—Herbert L. Lerner; Laurence A. Greenberg

[57] ABSTRACT

A method for dissolving a hardened glass solder, a method for separating components joined by a glass solder, a method for disassembling a fuel cell, and an apparatus for disassembling a fuel cell, include heating the hardened glass solder in a melt of a hydroxide. As a result, components which had been joined through the use of the hardened glass solder are able to be reused or subjected to a recycling process.

33 Claims, 1 Drawing Sheet ns in accordance with current environmental arguments. At the same time this will result in savings with respect to high material costs, since the metallic components can be reused or at least subjected to a recycling process, once the disassembling operation has been carried out. Moreover, these methods have been found to save time, since the metallic components can be pulled apart from one another after as little as a few hours and can be subjected to final cleaning.
METHOD FOR DISSOLVING A HARDENED GLASS SOLDER, METHOD FOR SEPARATING COMPONENTS JOINED BY A GLASS SOLDER, METHOD FOR DISASSEMBLING A FUEL CELL

CROSS-REFERENCE TO RELATED APPLICATION

This application is a continuation of International Application No. PCT/DE96/02028, filed Oct. 24, 1996, which designated the United States.

BACKGROUND OF THE INVENTION

Field of the Invention

The invention relates to a method for dissolving a hardened glass solder, a method for separating components joined through the use of a glass solder, a method for disassembling a fuel cell and an apparatus for disassembling a fuel cell.

It is known, in particular, from the book entitled "Fuel Cell Handbook" by A. J. Appelby and F. R. Foulkes, Van Nostrand Reinhold, 1988, pp. 442 to 454, that the components of a fuel cell are made of metal alloys or ceramics. In the case of a high-temperature fuel cell, $CrFe5Y_2O_31$, for example, is used as a material for a bipolar plate. High requirements placed on materials to be used, for example mechanical stability at an operating temperature of more than 800° C. in the high-temperature fuel cell, give rise to high material costs.

Depleting sources of raw materials and environmental issues necessitate the reuse of the materials of the components. Firstly, the reuse of the original component, once it has been cleaned, is desirable and secondly, after the recycling process has been carried out, the recovered material is used to fabricate a new component.

In the high-temperature fuel cell the individual components are joined by a glassy substance, for example a hardened glass solder. Subsequent use of the individual components or of the material of which the components are composed requires suitable regeneration of the components or of the high-temperature fuel cell.

SUMMARY OF THE INVENTION

It is accordingly an object of the invention to provide a method for dissolving a hardened glass solder, a method for separating components joined by a glass solder, a method for disassembling a fuel cell and an apparatus for disassembling a fuel cell, which overcome the hereinafore-mentioned disadvantages of the heretofore-known methods and apparatuses of this general type.

With the foregoing and other objects in view there is provided, in accordance with the invention, a method for dissolving a hardened glass solder, which comprises heating the hardened glass solder in a melt of a hydroxide.

With the objects of the invention in view there is also provided a method for separating components joined by a glass solder, which comprises heating the glass solder in a melt of a hydroxide.

With the objects of the invention in view there is additionally provided a method for disassembling a fuel cell having components joined by a glass solder, which comprises heating the fuel cell in a melt of a hydroxide, at least in a region of the glass solder.

With the objects of the invention in view there is further provided an apparatus for disassembling a fuel cell containing a plurality of units each including components joined by a glass solder, the apparatus comprising a trough for holding a melt of potassium hydroxide for heating the glass solder joining the components of the fuel cell units which are completely immersed in the melt; a mount for accommodating the units with surfaces of the units disposed parallel; and a lifting device disposed above the trough for supporting the mount.

Employing these methods will preserve the sources of raw material used for the materials of the metallic components, in accordance with current environmental arguments. At the same time this will result in savings with respect to high material costs, since the metallic components can be reused or at least subjected to a recycling process, once the disassembling operation has been carried out. Moreover, these methods have been found to save time, since the metallic components can be pulled apart from one another after as little as a few hours and can be subjected to final cleaning.

The metallic components are treated gently in the process, so that after the methods have been applied their surface textures do not differ significantly from their original state, when the components were used in the fuel cell for the first time.

In accordance with another mode of the invention, the melt which is used is a eutectic mixture of at least two hydroxides. The melt that is suitable for implementing the method is selected in accordance with the composition of the glass solder.

In accordance with a further mode of the invention, the hydroxide is potassium hydroxide or lithium hydroxide.

In accordance with an added mode of the invention, the hydroxide is sodium hydroxide.

In accordance with an additional mode of the invention, the melt of potassium hydroxide is admixed with water before it is heated. As a result of the addition of water, the dissolution process takes place in a lower temperature range which is readily accessible for industrial processes.

In accordance with yet another mode of the invention, the melt of potassium hydroxide is heated to a temperature of between 250 and 450° C. The high boiling point of the potassium hydroxide enables the melt to be used at high temperatures, resulting in an increase in the reaction rate. In this temperature range as specified, the method proves extremely successful and simple to implement in practical trials.

In accordance with yet a further mode of the invention, the melt of potassium hydroxide is heated between 250 and 360° C.

In accordance with yet an added mode of the invention, the melt of potassium hydroxide is repeatedly cooled and heated. Cooling and reheating the melt once or a number of times allows the separation process to be accelerated by utilizing the mechanical stress at the temperature differences that occur.

In accordance with a concomitant feature of the invention, the units can be moved by the lifting device within the trough, perpendicular to its bottom. The movement of the units in the melt of potassium hydroxide results in additional acceleration of the method.

Other features which are considered as characteristic for the invention are set forth in the appended claims.

Although the invention is illustrated and described herein as embodied in a method for dissolving a hardened glass solder, a method for separating components joined by a glass solder, a method for disassembling a fuel cell, and an apparatus for disassembling a fuel cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
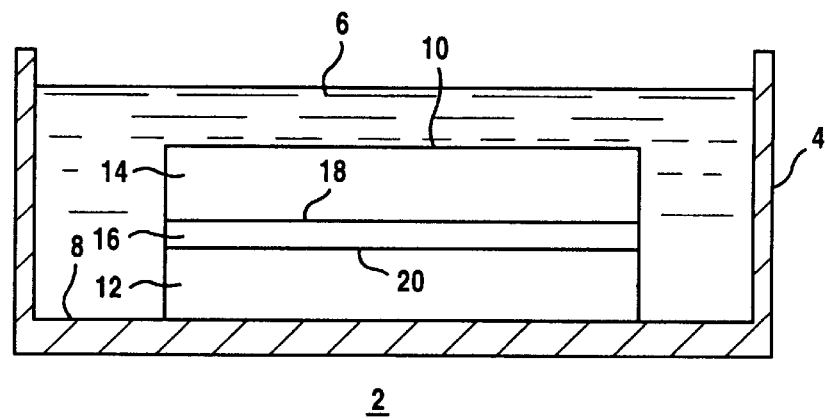
FIGS. 1 and 2 are respective diagrammatic, vertical-sectional and top-plan views of apparatuses for disassembling metallic components.

Referring now to the figures of the drawings in detail and first, particularly, to FIG. 1 thereof, there is seen an apparatus 2 for implementing a method for dissolving a hardened glass solder 16, including a trough 4 which is filled with a melt 6 of a hydroxide, for example potassium hydroxide, and a non-illustrated heating device.

The trough 4 has a bottom 8 on which a unit 10 is disposed. The unit 10 is composed of two components 12 and 14 which are joined through the use of the glass solder 16. The components 12, 14 may be typically made, for example, of a metal or a ceramic alloy and, for example, may be components 12, 14 of a fuel cell, for example bipolar plates of a high-temperature fuel cell. These bipolar plates can be made, for example, from $CrFe5Y_2O_31$.

The unit 10 is completely covered in the trough 4 by the melt 6 of potassium hydroxide. Potassium hydroxide in the nonmolten state is a white, crystalline substance which, if free from water and potassium carbonate, melts at 360° C. and boils at 1324° C. The melt 6 is preferentially used at a temperature of between 250 and 450° C. Practical trials of the method in this temperature range have proved successful. For the purpose of these trials, the unit 10, in which the components 12, 14 are made from $CrFe5Y_2O_31$, was soaked at approximately 250° C. for about 100 hours in the boiling melt 6 of potassium hydroxide. An observation of surfaces 18, 20 of the components 14, 12, after the method had been applied, showed local corrosion pits of a maximum depth of from 20 to 25 $\mu$m. These local attacks can be seen as noncritical, since the attacked surfaces 18, 20 of the components 12, 14 are removed, e.g. through the use of grinding. The performance of the components 12, 14 is not affected by this removal.

When the process is carried out in the industrially readily accessible temperature range of between 250 and 360° C., the melt 6 of potassium hydroxide is admixed, prior to heating, with a small amount of water. In general, the water that is present in the potassium hydroxide will actually be sufficient. However, the addition of more water will further reduce the melting point of the potassium hydroxide. If 20% water is added, the melting point of the potassium hydroxide drops to 200° C.

In order to further accelerate the method, the melt 6 of potassium hydroxide in the trough 4 is repeatedly cooled and heated. Rapid thermal cycling results in additional mechanical stresses which accelerate the method.

Lithium hydroxide, sodium hydroxide or a eutectic mixture of at least two hydroxides, are also used as the hydroxide. This method can therefore be used to disassemble fuel cells which are composed of components 12, 14 and to make them available for reuse once cleaning has been carried out.

Figure 2:
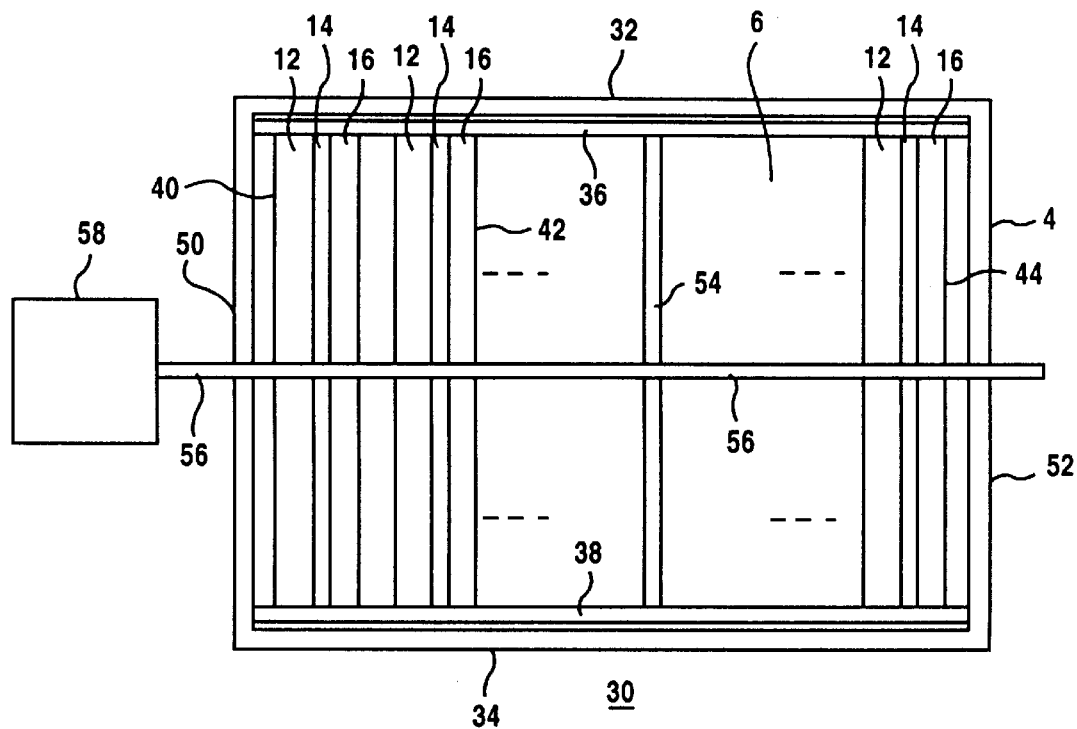

A further apparatus 30 for disassembling components is shown in FIG. 2 in a top-plan view. A mount 36, 38 which is disposed in the rectangular trough 4 runs along an edge parallel to long sides 32 and 34.

Plate-like units 40, 42, 44, each including the components 12, 14 that are joined through the use of the glass solder 16, are clipped into the mount 36, 38 in such a way that the surfaces 18 and 20 of the components 14 and 12 are respectively are aligned perpendicular to the long sides 32 and 34 of the rectangular trough 4 and parallel to end surfaces 50 and 52 thereof.

The mount 36, 38 is in turn supported in a lifting device 54, 56, 58 disposed above the trough 4. The lifting device 54, 56, 58 effects movement of the units 40, 42, 44 perpendicular to the bottom 8 of the rectangular trough 4 within the melt 6 of potassium hydroxide. This movement results in additional acceleration of the process defined by the method.

We claim:

1. A method for dissolving a hardened glass solder, which comprises:

providing a component containing at least one material selected from the group consisting of a metal, a metal alloy, and a ceramic alloy, the component having a hardened glass solder disposed thereon;

heating the hardened glass solder in a melt of a hydroxide; and dissolving the hardened glass solder.

2. A method for separating components joined by a glass solder, which comprises:

providing components containing at least one material selected from the group consisting of a metal, a metal alloy, and a ceramic alloy, the components being joined by a hardened glass solder;

heating the glass solder joining the components in a melt of a hydroxide.

3. A method for disassembling a fuel cell having components joined by a glass solder, which comprises:

providing a fuel cell having components, the components containing at least one material selected from the group consisting of a metal, a metal alloy, and a ceramic alloy, and the components being joined by a hardened glass solder;

heating the fuel cell in a melt of a hydroxide, at least in a region of the glass solder joining the components of the fuel cell.

4. The method according to claim 1, which comprises selecting the melt as a eutectic mixture of at least two hydroxides.

5. The method according to claim 2, which comprises selecting the melt as a eutectic mixture of at least two hydroxides.

6. The method according to claim 3, which comprises selecting the melt as a eutectic mixture of at least two hydroxides.

7. The method according to claim 1, which comprises selecting the hydroxide as potassium hydroxide.

8. The method according to claim 2, which comprises selecting the hydroxide as potassium hydroxide.

9. The method according to claim 3, which comprises selecting the hydroxide as potassium hydroxide.

10. The method according to claim 1, which comprises selecting the hydroxide as lithium hydroxide.

11. The method according to claim 2, which comprises selecting the hydroxide as lithium hydroxide.

12. The method according to claim 3, which comprises selecting the hydroxide as lithium hydroxide.

13. The method according to claim 1, which comprises selecting the hydroxide as sodium hydroxide.

14. The method according to claim 2, which comprises selecting the hydroxide as sodium hydroxide.

15. The method according to claim 3, which comprises selecting the hydroxide as sodium hydroxide.

16. The method according to claim 7, which comprises admixing the potassium hydroxide with water before heating.

17. The method according to claim 8, which comprises admixing the potassium hydroxide with water before heating.

18. The method according to claim 9, which comprises admixing the potassium hydroxide with water before heating.

19. The method according to claim 16, which comprises heating the melt of potassium hydroxide to a temperature of between 250 and 450° C.

20. The method according to claim 17, which comprises heating the melt of potassium hydroxide to a temperature of between 250 and 450° C.

21. The method according to claim 18, which comprises heating the melt of potassium hydroxide to a temperature of between 250 and 450° C.

22. The method according to claim 16, which comprises heating the melt of potassium hydroxide to a temperature of between 250 and 360° C.

23. The method according to claim 17, which comprises heating the melt of potassium hydroxide to a temperature of between 250 and 360° C.

24. The method according to claim 18, which comprises heating the melt of potassium hydroxide to a temperature of between 250 and 360° C.

25. The method according to claim 16, which comprises repeatedly cooling and heating the melt of potassium hydroxide.

26. The method according to claim 17, which comprises repeatedly cooling and heating the melt of potassium hydroxide.

27. The method according to claim 18, which comprises repeatedly cooling and heating the melt of potassium hydroxide.

28. The method according to claim 19, which comprises repeatedly cooling and heating the melt of potassium hydroxide.

29. The method according to claim 20, which comprises repeatedly cooling and heating the melt of potassium hydroxide.

30. The method according to claim 21, which comprises repeatedly cooling and heating the melt of potassium hydroxide.

31. The method according to claim 22, which comprises repeatedly cooling and heating the melt of potassium hydroxide.

32. The method according to claim 23, which comprises repeatedly cooling and heating the melt of potassium hydroxide.

33. The method according to claim 24, which comprises repeatedly cooling and heating the melt of potassium hydroxide.

* * * * *